United States Patent
Harada (10) Patent No.: US 9,473,015 B2
(45) Date of Patent: Oct. 18, 2016

(54) POWER SUPPLY SYSTEM

(71) Applicant: Yuya Harada, Okazaki (JP)

(72) Inventor: Yuya Harada, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/171,877

(22) Filed: Feb. 4, 2014

(65) Prior Publication Data

US 2014/0218981 A1     Aug. 7, 2014

(30) Foreign Application Priority Data

Feb. 6, 2013 (JP) ................................ 2013-021195

(51) Int. Cl.
 *H02M 1/00* (2006.01)
 *H02M 1/36* (2007.01)

(52) U.S. Cl.
 CPC ....... *H02M 1/36* (2013.01); *H02M 2001/0006* (2013.01)

(58) Field of Classification Search
 CPC .................... H02M 1/36; H02M 2001/0006
 USPC ............ 363/16, 17, 19, 21.01, 21.02, 21.04, 363/21.06, 21.07, 21.1, 21.13–21.18, 25, 363/37, 44, 53
 See application file for complete search history.

(56) References Cited

U.S. PATENT DOCUMENTS

| | | |
|---|---|---|
| 4,910,654 A | 3/1990 | Forge |
| 5,032,968 A | 7/1991 | Mikami et al. |
| 5,231,309 A | 7/1993 | Soma et al. |
| 5,546,161 A | 8/1996 | Sakai et al. |
| 5,659,371 A | 8/1997 | Krause |
| 5,670,832 A | 9/1997 | Takeda |
| 5,914,538 A | 6/1999 | Kurosawa et al. |
| 6,115,266 A | 9/2000 | Matsui et al. |
| 6,262,565 B1 | 7/2001 | Williams et al. |
| 6,353,543 B2 | 3/2002 | Itoh et al. |

(Continued)

FOREIGN PATENT DOCUMENTS

| | | |
|---|---|---|
| JP | S47-21184 B | 6/1972 |
| JP | 62-064256 A | 3/1987 |

(Continued)

OTHER PUBLICATIONS

Office Action issued in corresponding Japanese patent application No. 2011-245775, Jan. 20, 2015 (with partial English-language translation); 10 pages.

(Continued)

*Primary Examiner* — Adolf Berhane
*Assistant Examiner* — Afework Demisse
(74) *Attorney, Agent, or Firm* — Merchant & Gould P.C.

(57) ABSTRACT

A power supply system includes: a switching power supply; a control device; an auxiliary power supply circuit, which is connected in parallel with the switching power supply with respect to an AC power supply, which includes an electricity storage unit for storing electricity by charging current fed from the alternating current power supply, and which feeds power to the control device; and a first switching unit for switching a connection state of the auxiliary power supply circuit to the alternating current power supply. The control device is configured to, upon starting up the switching power supply, switch the first switching unit into a state where the auxiliary power supply circuit is separated from the alternating current power supply.

5 Claims, 8 Drawing Sheets

(56) References Cited

U.S. PATENT DOCUMENTS

| | | |
|---|---|---|
| 6,408,148 B1 | 6/2002 | Yamamoto |
| 6,476,589 B2 | 11/2002 | Umminger et al. |
| 7,602,158 B1 | 10/2009 | Iacob |
| 7,639,963 B2 | 12/2009 | Matsuo |
| 8,035,940 B2 * | 10/2011 | Lee .................. H02H 7/1213 361/42 |
| 8,503,900 B2 | 8/2013 | Inukai |
| 2004/0190923 A1 | 9/2004 | Inukai |
| 2005/0169658 A1 | 8/2005 | Hanamoto et al. |
| 2008/0292351 A1 | 11/2008 | Matsuda et al. |
| 2008/0309163 A1 | 12/2008 | Hashimoto et al. |
| 2009/0060558 A1 | 3/2009 | Uehara |
| 2009/0128347 A1 * | 5/2009 | Bucella .................. H02H 11/006 340/654 |
| 2009/0168461 A1 | 7/2009 | Nakahori |
| 2009/0180229 A1 | 7/2009 | Lee |
| 2009/0230781 A1 | 9/2009 | Hung et al. |
| 2010/0001695 A1 | 1/2010 | Arai et al. |
| 2010/0060000 A1 * | 3/2010 | Scholte-Wassink |
| 2010/0122096 A1 | 5/2010 | Ozenc |
| 2010/0256897 A1 | 10/2010 | Takata et al. |
| 2011/0063759 A1 | 3/2011 | Billingsley et al. |
| 2011/0064445 A1 | 3/2011 | Yashiro |
| 2011/0110129 A1 * | 5/2011 | Busch ........................ 363/53 |
| 2012/0025630 A1 | 2/2012 | Tsuda |
| 2012/0060786 A1 | 3/2012 | Okada et al. |
| 2012/0148273 A1 | 6/2012 | Shimura et al. |
| 2012/0206057 A1 | 8/2012 | Kim et al. |
| 2013/0028623 A1 | 1/2013 | Inukai |
| 2013/0031396 A1 | 1/2013 | Inukai |
| 2013/0038318 A1 | 2/2013 | Inukai |
| 2013/0111237 A1 | 5/2013 | Inukai |
| 2013/0113292 A1 | 5/2013 | Inukai |
| 2013/0129373 A1 | 5/2013 | Inukai |
| 2014/0210264 A1 | 7/2014 | Inukai |
| 2014/0218827 A1 | 8/2014 | Inukai |
| 2014/0233266 A1 | 8/2014 | Inukai |

FOREIGN PATENT DOCUMENTS

| | | |
|---|---|---|
| JP | S64-034174 A | 2/1989 |
| JP | H02-060443 A | 5/1990 |
| JP | 2-250670 A | 10/1990 |
| JP | 4-14486 U | 2/1992 |
| JP | 4-51260 A | 2/1992 |
| JP | H05-119557 A | 5/1993 |
| JP | 7-87734 H | 3/1995 |
| JP | 7-308065 H | 11/1995 |
| JP | 9-23638 H | 1/1997 |
| JP | 2000-095384 A | 10/2000 |
| JP | 2001-005350 A | 1/2001 |
| JP | 2001-025163 A | 1/2001 |
| JP | 2001-037236 A | 2/2001 |
| JP | 2001-251853 A | 9/2001 |
| JP | 2004-151998 A | 5/2004 |
| JP | 2004-187391 A | 7/2004 |
| JP | 2004-274887 A | 9/2004 |
| JP | 2004-303469 A | 10/2004 |
| JP | 2005-151672 A | 6/2005 |
| JP | 2005-221677 A | 8/2005 |
| JP | 2006-129651 A | 5/2006 |
| JP | 2007-124879 A | 5/2007 |
| JP | 2007-159344 A | 6/2007 |
| JP | 2007-244110 A | 9/2007 |
| JP | 2008-070639 A | 3/2008 |
| JP | 2008-072887 A | 3/2008 |
| JP | 2009-003424 A | 1/2009 |
| JP | 2009-284561 A | 12/2009 |
| JP | 2010-172149 A | 8/2010 |
| JP | 2010-239774 A | 10/2010 |
| JP | 2010-252574 A | 11/2010 |
| JP | 2011-120366 A | 6/2011 |
| JP | 2011-125132 A | 6/2011 |
| JP | 2011-176911 A | 9/2011 |
| JP | 2011-199976 | 10/2011 |
| JP | 2011-212951 A | 10/2011 |
| JP | 2012-016091 A | 1/2012 |
| JP | 2013-102650 A | 5/2013 |
| WO | 97-50165 A1 | 12/1997 |

OTHER PUBLICATIONS

U.S. Office Action (Notice of Allowance) issued in related U.S. Appl. No. 14/169,487, Aug. 17, 2015.

U.S. Office Action (Notice of Allowance) issued in related U.S. Appl. No. 14/169,933, mailed Jul. 7, 2015.

U.S. Office Action issued in related U.S. Appl. No. 13/629,511, mailed Jun. 19, 2015.

U.S. Office Action issued in related U.S. Appl. No. 14/181,212, Jan. 21, 2016.

Office Action issued in corresponding Japanese patent application No. 2013-021195, Jul. 21, 2016 (with partial English-language translation); 9 pages.

Office Action issued in corresponding Japanese patent application No. 2013-018217, Jul. 28, 2016 (with partial English-language translation); 6 pages.

Office Action issued in corresponding Japanese patent application No. 2013-028711, Jul. 28, 2016 (with partial English-language translation); 9 pages.

U.S. Office Action (Notice of Allowance) issued in related application U.S. Appl. No. 14/181,212, Jul. 21, 2016.

Offce Action issued in corresponding Japanese patent application No. 2013-0017705, Aug. 2, 2016 (with English-language translation); 20 pages.

* cited by examiner

POWER SUPPLY SYSTEM

CROSS-REFERENCE TO RELATED APPLICATIONS

This application claims priority from Japanese Patent Application No. 2013-021195 filed on Feb. 6, 2013, the entire subject-matter of which is incorporated herein by reference.

TECHNICAL FIELD

The invention relates to a technology of suppressing power consumption of a power supply system.

BACKGROUND

There has been proposed a technology in which a main power supply control unit stops oscillation of an output transformer of a switching power supply and a secondary battery feeds power to the main power supply control unit during the oscillation stop, thereby saving the power.

SUMMARY

Illustrative aspects of the invention provide a technology of saving power of a power supply system.

According to one illustrative aspect of the invention, there is provided a power supply system comprising: a switching power supply configured to convert an alternating current voltage from an alternating current power supply into a predetermined direct current voltage and to output the direct current voltage; a control device; an auxiliary power supply circuit, which is connected in parallel with the switching power supply with respect to the alternating current power supply, and which comprises an electricity storage unit configured to store electricity by charging current fed from the alternating current power supply, wherein the auxiliary power supply circuit is configured to feed power to the control device; and a first switching unit configured to switch a connection state of the auxiliary power supply circuit to the alternating current power supply. The control device is configured to, upon starting up the switching power supply, switch the first switching unit into a state where the auxiliary power supply circuit is separated from the alternating current power supply.

DETAILED DESCRIPTION

General Overview

The above-described related-art technology has some disadvantages. For example, in a case where not only the switching power supply but also a circuit is connected to an alternating current power supply, current may flow from the alternating current power supply to the circuit, so that the power may be uselessly consumed.

Therefore, illustrative aspects of the invention provide a technology of saving power of a power supply system.

According to one illustrative aspect of the invention, there is provided a power supply system comprising: a switching power supply configured to convert an alternating current voltage from an alternating current power supply into a predetermined direct current voltage and to output the direct current voltage; a control device; an auxiliary power supply circuit, which is connected in parallel with the switching power supply with respect to the alternating current power supply, and which comprises an electricity storage unit configured to store electricity by charging current fed from the alternating current power supply, wherein the auxiliary power supply circuit is configured to feed power to the control device; and a first switching unit configured to switch a connection state of the auxiliary power supply circuit to the alternating current power supply. The control device is configured to, upon starting up the switching power supply, switch the first switching unit into a state where the auxiliary power supply circuit is separated from the alternating current power supply.

Incidentally, the 'separation' has a meaning that the auxiliary power supply circuit is electrically disconnected from the alternating current power supply, e.g., the current is disabled from flowing from the alternating current power supply towards the auxiliary power supply circuit. The 'separation' also includes a case where a line connecting the alternating current power supply and the auxiliary power supply circuit is opened and a case where the electricity storage unit provided for the auxiliary power supply circuit is separated from the alternating current power supply and the current is thus disabled from flowing from the alternating current power supply towards electricity storage unit of the auxiliary power supply circuit.

In the above configuration, while the switching power supply is operating, since the auxiliary power supply circuit is separated from the alternating current power supply, it is possible to suppress the current from flowing from the alternating current power supply towards the auxiliary power supply circuit. Therefore, it is possible to save the power.

As an illustrative embodiment of the power supply system, a following configuration is preferable.

The power supply system may further comprise a second switching unit configured to switch a connection state of the switching power supply to the alternating current power supply. The control device may be configured to, in a case of stopping the switching power supply, switch the second switching unit into a state where the switching power supply is separated from the alternating current power supply.

According to thereto, while the switching power supply is at a stop, the switching power supply is separated from the alternating current power supply. Therefore, it is possible to suppress the current from flowing from the alternating current power supply towards the switching power supply. Accordingly, it is possible to save the power.

The first switching unit may be provided on any one of a pair of lines connecting the alternating current power supply and the auxiliary power supply circuit.

According thereto, compared to a configuration where the first switching unit is provided for both a pair of lines, it is possible to reduce the number of switching units.

The first switching unit may be a relay comprising a transfer contact point configured to selectively switch a connection destination of the alternating current power supply to any one of the switching power supply and the auxiliary power supply circuit.

According thereto, the first switching unit and the second switching unit can be configured by one relay. Therefore, it is possible to reduce the number of switching units.

The first switching unit may be provided on both of a pair of lines connecting the alternating current power supply and the auxiliary power supply circuit.

According thereto, compared to a configuration where the first switching unit is provided for any one of the pair of lines, it is possible to suppress the current.

The auxiliary power supply circuit may comprise: a coupling capacitor; and a rectification circuit, which is connected to the alternating current power supply through the coupling capacitor, and which is configured to rectify the alternating current voltage from the alternating current power supply. The electricity storage unit may be configured to store electricity by current that is output from the rectification circuit and functions as the charging current. The first switching unit may be provided on a line connecting the rectification circuit and the electricity storage unit.

The first switching unit may comprise a semiconductor switching device.

According thereto, it is possible to make the circuit smaller, compared to a configuration where the first switching unit is configured by the relay.

The auxiliary power supply circuit may comprise: a coupling capacitor; and a rectification circuit, which is connected to the alternating current power supply through the coupling capacitor, and which is configured to rectify the alternating current voltage from the alternating current power supply. The electricity storage unit may be configured to store electricity by current that is output from the rectification circuit and functions as the charging current. The first switching unit may be provided on a line connecting the alternating current power supply and the coupling capacitor.

According to the illustrative aspects of the invention, it is possible to save the power.

ILLUSTRATIVE EMBODIMENTS

First Illustrative Embodiment

A first illustrative embodiment of the invention will be described with reference to FIGS. 1 to 4.

1. Printer

Figure 1:
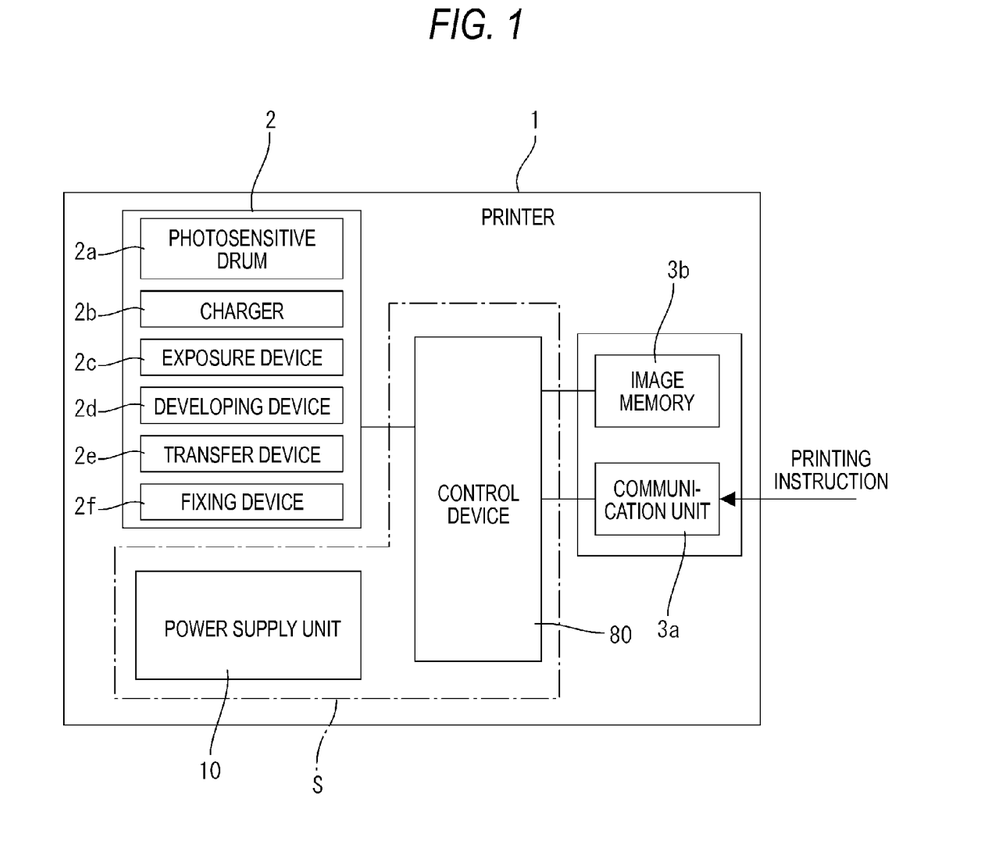
FIG. 1 is a block diagram showing an electrical configuration of a printer according to a first illustrative embodiment.

FIG. 1 is a block diagram showing an electrical configuration of a printer (which is an example of the 'image forming apparatus') 1. The printer 1 has a printing unit 2, a communication unit 3a, an image memory 3b and a power supply system S. The power supply system S has a power supply device 10 and a control device 80. The power supply device 10 is a power supply of the printer 1 and feeds power to the printing unit 2, the communication unit 3a, the image memory 3b and the control device 80.

The printing unit 2 has a photosensitive drum 2a, a charger 2b that executes a charging process of charging a surface of the photosensitive drum 2a, an exposure device 2c that executes an exposing process of forming an electrostatic latent image on the surface of the photosensitive drum 2a, a developing device 2d that executes a developing process of attaching developer on the electrostatic latent image formed on the surface of the photosensitive drum 2a to thereby form a developer image, a transfer device 2e that executes a transfer process of transferring the developer image to a recording medium and a fixing device 2f that executes a fixing process of fixing the developer image transferred onto the recording medium.

The printing unit 2 executes the charging process, the exposing process, the developing process, the transfer process and the fixing process, thereby executing a printing process of printing print data on the recording medium. The communication unit 3a performs communication with an information terminal apparatus such as a PC and receives a printing instruction or print data from the information terminal apparatus. The image memory 3b temporarily stores therein the print data received from the information terminal apparatus.

When the communication unit 3a receives a printing instruction and print data from the information terminal apparatus, the control device 80 of the printer 1 enables the printing unit 2 to execute the printing process consisting of the charging process, the exposing process, the developing process, the transfer process and the fixing process, thereby printing the print data on the recording medium. Incidentally, while an operating voltage of the printing unit 2 is 24V, operating voltages of the communication unit 3a, the image memory 3b and the control device 80 are 3.3V.

2. Power Supply System

First, a configuration of the power supply device 10 of the power supply system S will be described with reference to FIG. 2. The power supply device 10 includes a switching power supply 20, an auxiliary power supply circuit 50 configured to feed power to the control device 80 and a capacitor C1, a relay 60 and a relay driving circuit 70. Incidentally, the relay 60 is an example of the 'first switching unit' of the invention.

The switching power supply 20 converts an alternating current (AC) voltage from the alternating current power supply 15 into a direct current (DC) voltage and outputs the direct current voltage. The switching power supply 20 includes a rectification smoothing circuit 21, a transformer 23, an FET (Field Effect Transistor) 25, a rectification smoothing circuit 27, a control IC 30 configured to perform switching-control (on-off control) of the FET 25, a DC-DC converter 35 and a Y capacitor 37 and an X capacitor 38 for attenuating a noise of a primary-side of the switching power supply 20. The Y capacitor 37 is provided to an upstream side of the rectification smoothing circuit 21 and to a downstream side of the relay 60. When the switching power supply 20 is connected to the AC power supply 15 and is in an operating state, a current I1 flowing toward the switching power supply 20 is branched at the Y capacitor 37, and the branched current I3 is grounded though the capacitor of the Y capacitor 37, as shown in FIG. 3. According thereto, the noise of the primary-side of the switching power supply 20 can be attenuated.

The rectification smoothing circuit 21 is a so-called capacitor input type and has a bridge diode D3 for rectifying the AC voltage from the AC power supply 15 and a capacitor C3 for smoothing the rectified voltage. The transformer 23 is provided at an output-side of the rectification smoothing circuit 21 and an input voltage Vin, which is obtained by rectifying and smoothing the AC voltage, is applied to a primary coil N1 of the transformer 23.

The FET 25 is an N-channel MOSFET and has a drain D, which is connected to the primary coil N1, and a source S, which is connected to a reference potential of the primary-side. As an on/off signal (PWM signal) is applied to a gate G from an output port OUT of the control IC 30, the FET 25 becomes on/off at a predetermined period. Thereby, the primary-side of the transformer 23 oscillates, so that a voltage is induced to a secondary coil N2 of the transformer 23.

The rectification smoothing circuit 27 is provided at a secondary-side of the transformer 23 and has a diode D2 and a capacitor C2. The rectification smoothing circuit 27 rectifies and smoothes a voltage that is induced to the secondary coil N2 of the transformer 23. Thereby, the switching power supply 20 outputs a voltage of DC 24V through an output line Lo1.

Figure 2:
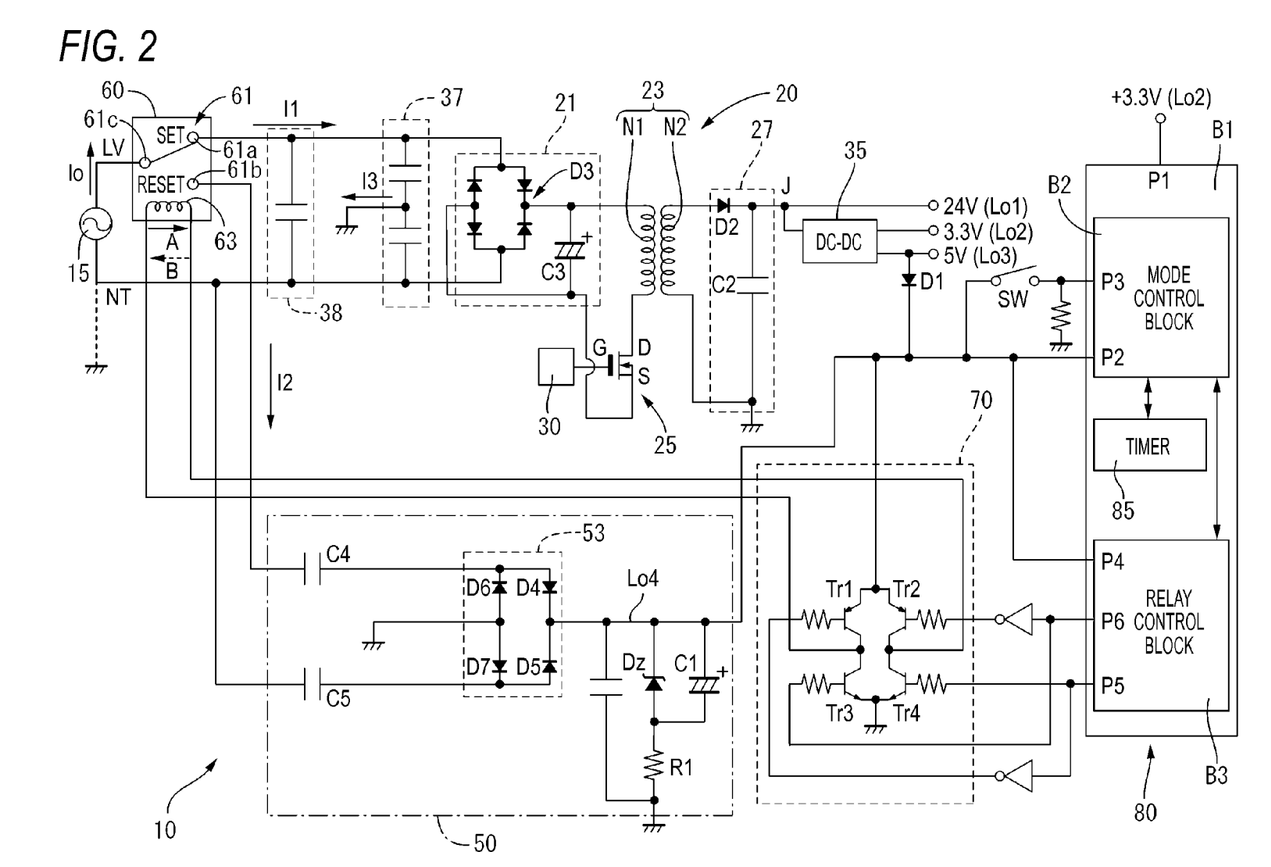
FIG. 2 is a circuit diagram of a power supply system.
Figure 3:
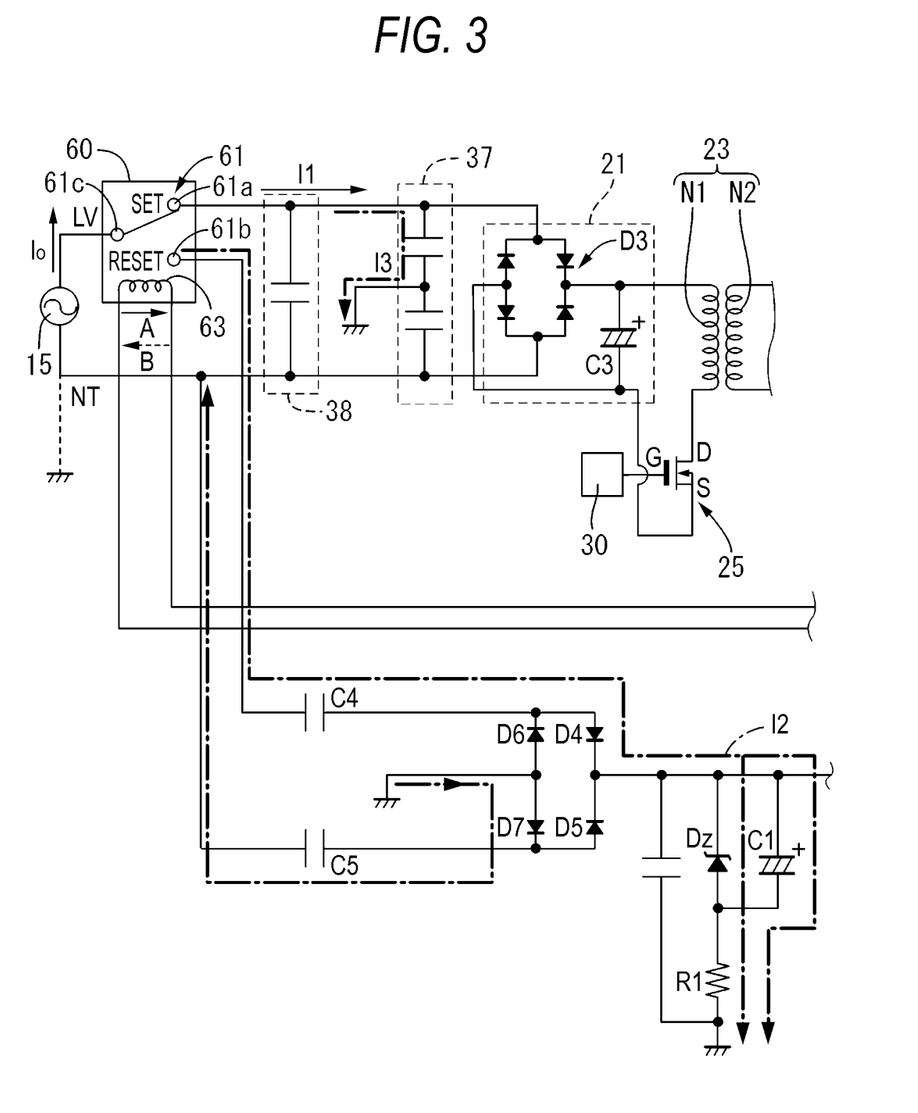
FIG. 3 is a view of enlarging a part of FIG. 2, showing a current path.

As shown in FIG. 2, the output line Lo1 is branched into two lines at a branch point J, and the branched line is provided with the DC-DC converter 35. The DC-DC converter 35 drops an output voltage Vo1 of the switching power supply 20 to 3.5V and 5V and outputs the same from output lines Lo2, Lo3. Like this, the switching power supply 20 is configured to output the three voltages of 24V/5V/3.3V. Incidentally, when the switching power supply 20 is connected to the AC power supply 15, it automatically starts up and shifts to an output state (usual mode). This is because the connection to the AC power supply 15 is made, so that the control IC 30, which starts up upon receiving the power fed from the AC power supply 15, starts the switching control (the control of turning on and off the FET 25 with a predetermined period) for the FET 25.

In the below, the auxiliary power supply circuit 50 will be described.

The auxiliary power supply circuit 50 is a circuit that is connected in parallel with the switching power supply 20 with respect to the AC power supply 15 and has functions of feeding the power to the control device 80 and supplying charging current to the capacitor C1 when the switching power supply 20 is at a stop.

Specifically, the auxiliary power supply circuit 50 includes coupling capacitors C4, C5, a rectification circuit 53 and the capacitor C1 functioning as an electricity storage unit. The rectification circuit 53 is a bridge diode (four bridge-connected diodes D4 to D7). The rectification circuit 53 is connected to the AC power supply 15 via the coupling capacitors C4, C5 and is configured to rectify the AC voltage from the AC power supply 15. An output line Lo4 of the rectification circuit 53 is connected with the capacitor C1, and current that is output by the rectification circuit 53 is supplied to the capacitor C1 as the charging current. Incidentally, the capacitor C1 is connected to a ground through a current restriction resistance R1 and is connected in parallel with a zener diode Dz, so that it stabilizes a charging voltage.

Subsequently, the relay 60 and the relay driving circuit 70 will be described. The relay 60 is provided on a line of a live LV-side of a pair of lines (two lines of a live LV-side and a neutral NT-side) drawn out from the AC power supply 15. Incidentally, the live LV-side means a non-grounded side, and the neutral NT-side means a grounded side.

The relay 60 includes a transfer contact point 61 and a driving coil 63 configured to switch the transfer contact point 61. The transfer contact point 61 includes two fixed contact points 61a, 61b and a moveable contact point 61c. The transfer contact point 61 has a function of selectively switching a connection destination of the AC power supply 15 to any one of the switching power supply 20 and the auxiliary power supply circuit 50. Specifically, the moveable contact point 61c is connected to the AC power supply 15, the fixed contact point 61a of a set-side is connected to the switching power supply 20, and the fixed contact point 61b of a reset-side is connected to the auxiliary power supply circuit 50.

For this reason, when the driving coil 63 is energized in a forward direction (an A direction shown in FIG. 2) to thus close the fixed contact point 61a of a set-side, the switching power supply 20 is connected to the AC power supply 15. On the other hand, when the driving coil 43 is energized in a reverse direction (a B direction shown in FIG. 2) to thus close the fixed contact point 61b of a reset-side, the auxiliary power supply circuit 50 is connected to the AC power supply 15. Incidentally, the fixed contact point 61a of a set-side is provided at a closer position to the AC power supply 15 than an X capacitor 38 or Y capacitor 37 of the switching power supply 20. Also, the fixed contact point 61b of a reset-side is provided at a closer position to the AC power supply 15 than the coupling capacitor C4 of the auxiliary power supply circuit 50.

The relay driving circuit 70 is a circuit configured to drive (energization-control) the driving coil 63. The relay driving circuit 70 includes two PNP transistors Tr1, Tr2 and two NPN transistors Tr3, Tr4.

As shown in FIG. 2, the transistor Tr1 and the transistor Tr2 have emitters that are commonly connected to the capacitor C1. On the other hand, the transistor Tr3 and the transistor Tr4 have emitters that are commonly connected to the ground. Collectors of the transistor Tr1 and the transistor Tr3 are connected to each other, and collectors of the transistor Tr2 and the transistor Tr4 are connected to each other.

Among the four transistors Tr1, Tr2, Tr3, Tr4, the transistor Tr1 and the transistor Tr4 are connected to a control port P5 and are on-off controlled by the control port P5. Also, the transistor Tr2 and the transistor Tr3 are connected to a control port P6 and are on-off controlled by the control port P6.

When a driving signal (an on-signal) is output from the control port P5 of a relay control block B3 of the control device 80, which will be subsequently described, the transistor Tr1 and the transistor Tr4 become on. Thereby, since the forward current flows to the driving coil 63 through the rectification circuit 53 and capacitor C1 of the auxiliary power supply circuit 50 in the A direction shown in FIG. 2, it is possible to close the fixed contact point 61a of a set-side of the relay 60.

On the other hand, when a driving signal (an on-signal) is output from the control port P6 of the relay control block B3, the transistor Tr2 and the transistor Tr3 become on. Thereby, since the reverse current flows to the driving coil 63 through the rectification circuit 53 and capacitor C1 of the auxiliary power supply circuit 50 in the B direction shown in FIG. 2, it is possible to close the fixed contact point 61b of a reset-side of the relay 60. Incidentally, when driving the relay 60, the capacitor C1 replenishes the current, which is supplied from the rectification circuit 53, with insufficient current and supplies the same. Also, in this illustrative embodiment, since a latching relay is used as the relay 60, it is possible to configure the driving signal (the on-signal) by a pulse signal. That is, the energization after the relay switching is not necessary. When the driving signal (the on-signal) is output to the relay 60 only upon the switching, it is possible to stop the driving signal (the on-signal) after the switching.

The control device 80 includes a main block B1 configured to control the printing unit 2 of the printer 1, a mode control block B2, the relay control block B3 and a timer 85. The respective blocks B1 to B3 may be configured by one or more CPUs, a hardware circuit such as ASIC or a combination of the CPU and the hardware circuit.

A power supply port P1 of the main block B1 is connected to the output line Lo2 of the DC-DC converter 35 and is fed with the power from the switching power supply 20 through the DC-DC converter 35. Incidentally, the main block B1 is fed with the power and is thus at an operating state only during the usual mode where the switching power supply 20 is at an output state. When the switching power supply 20 shifts to a power saving mode where the switching power supply stops the output, the main block is not fed with the power and is thus at a stop state.

Incidentally, the description that the switching power supply stops the output means that the fixed contact point 61b of a reset-side of the relay 60 is at a closed state. That is, when the fixed contact point 61b is closed, the switching power supply 20 is separated from the AC power supply 15, so that the alternating current input is cut off. As a result, the switching power supply is at an output stop state (a state where a voltage is not generated at the secondary-side).

In the printer 1 according to the illustrative embodiment, when the standby time (standby time of the printer) reaches predetermined time, the printer shifts to the power saving mode. A length of the standby time is measured by the timer 85. Also, when a switching switch SW is operated by a user, the printer shifts to the usual mode. The mode control block B2 is provided with a detection port P3 configured to detect whether the switch SW is operated or not. The mode control block B2 monitors a voltage of the detection port P3 to thus detect whether the switch SW is operated or not.

The relay control block B3 has a function of switching the relay 60 through the relay driving circuit 70. As described above, the relay control block B3 is provided with the two control ports P5, P6. When the driving signal (on-signal) is output from the control port P5, the fixed contact point 61a of a set-side of the relay 60 can be closed, and when the driving signal (on-signal) is output from the control port P6, the fixed contact point 61b of a reset-side of the relay 60 can be closed.

Incidentally, a power supply port P2 of the mode control block B2 and a power supply port P4 of the relay control block B3 are connected to the output line Lo3 of the switching power supply 20 through the diode D1. For this reason, the mode control block B2 and the relay control block B3 are fed with the power from the switching power supply 20 and are thus operated while the switching power supply 20 is operating. Also, the power supply port P2 of the mode control block B2 and the power supply port P4 of the relay control block B3 are connected to the output line Lo4 of the rectification circuit 53 and are also fed with the power from the auxiliary power supply circuit 50. For this reason, the mode control block B2 and the relay control block B3 are fed with the power from the auxiliary power supply circuit 50 and can be thus operated even when the switching power supply 20 is at a stop (during the power saving mode). Also, both the control blocks B2, B3 can communicate with each other and transmit a variety of information therebetween.

3. Switching Control of Relay 60 and Power Consumption of Power Supply Device 10

In the printer 1, the switching power supply 20 and the auxiliary power supply circuit 50 are connected in parallel with the AC power supply 15. For this reason, when the auxiliary power supply circuit 50 is connected to the AC power supply 15 all the time, during the usual mode, an output current Io of the AC power supply 15 is a sum of a current I1 flowing through the switching power supply 20 and a current I2 flowing through the auxiliary power supply circuit 50 from the AC power supply 15. In order to save the power of the power supply device 10, it is preferable to suppress the output current Io.

Therefore, in the printer 1, when starting up the switching power supply 20 (when shifting to the usual mode), the relay 60 is switched to close the fixed contact point 61a of a set-side. According thereto, while the switching power supply 20 is operating, the auxiliary power supply circuit 50 is separated from the AC power supply 15, so that it is possible to interrupt the current I2 flowing from the AC power supply 15 towards the auxiliary power supply circuit 50 (see FIG. 3). Therefore, while the switching power supply is operating, it is possible to suppress the output current Io of the AC power supply 15, thereby saving the power of the power supply device 10.

Further, when stopping the switching power supply 20 (when shifting to the power saving mode), the relay 60 is switched to close the fixed contact point 61b of a reset-side. According thereto, during the power saving mode, the switching power supply 20 is separated from the AC power supply 15, so that it is possible to interrupt current I1 flowing towards the switching power supply 20.

Therefore, while the switching power supply 20 is at a stop, it is possible to suppress the output current Io of the AC power supply 15, thereby saving the power of the power supply device 10.

Incidentally, by the power supply device 10 disclosed in this illustrative embodiment, the 'auxiliary power supply circuit 50 includes: the coupling capacitors C4, C5; and the rectification circuit 53, which is connected to the AC power supply 15 through the coupling capacitors C4, C5, and which is configured to rectify the alternating current voltage from the AC power supply 15, the electricity storage unit (in this illustrative embodiment, the capacitor C1) is configured to store the electricity by the current that is output from the rectification circuit 53 and functions as the charging current, and the first switching unit (in this illustrative embodiment, the relay 60) is provided on the line (in this illustrative embodiment, the power supply line of the LV-side) connecting the AC power supply 15 and the coupling capacitor C4 each other' of the invention.

4. Switching Sequence of Relay 60

Figure 4:
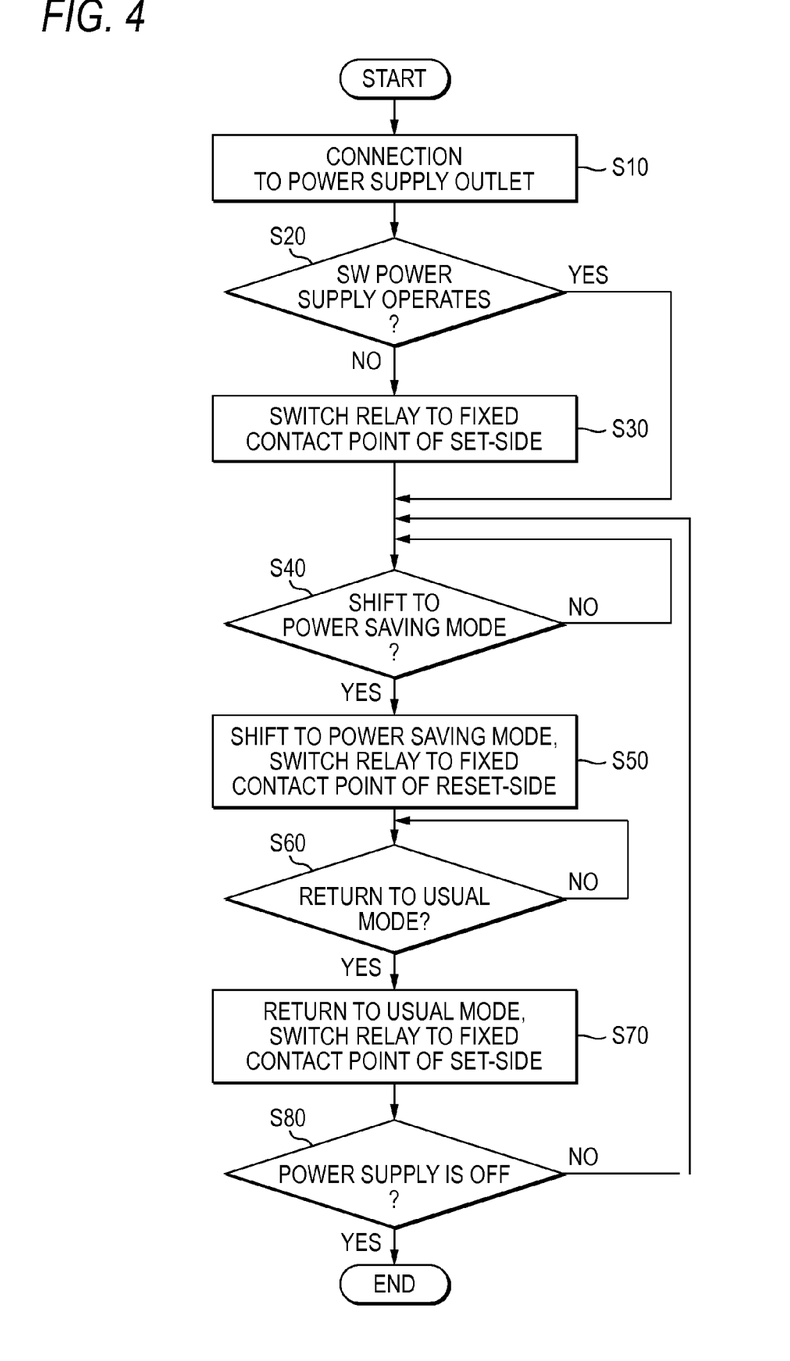
FIG. 4 is a flowchart showing a switching sequence of a relay.

In the below, a switching sequence of the relay 60 that is executed by the control device 80 will be described with reference to FIG. 4. Incidentally, it is assumed that the contact point 61b of a reset-side of the relay 60 is closed.

After connection to a power supply outlet is made (for example, a power supply cable is connected to the power supply outlet), the mode control block B2 of the control device 80 is fed with the power from the auxiliary power supply circuit 50 and is thus operated and determines whether the switching power supply 20 is operating (S10, S20).

It is possible to determine whether the switching power supply 20 is operating by monitoring a line voltage of the output line Lo3 of the switching power supply 20 with the mode control block B2 and determining a voltage level of the line voltage. That is, when the line voltage exceeds a setting value, it can be determined that the switching power supply 20 is 'operating', and when the line voltage is below the setting value, it can be determined that the switching power supply 20 is 'not operating.' Incidentally, the switching power supply 20 automatically operates in response to the AC input from the AC power supply 15. Therefore, when the switching power supply 20 is not operating even though the connection to the power supply outlet is made, it means that the fixed contact point 61*a* of a set-side of the relay 60 is opened and the switching power supply 20 is thus separated from the AC power supply 15.

When it is determined that the switching power supply 20 is not operating, e.g., when the fixed contact point 61*a* of a set-side of the relay 60 is opened and the switching power supply 20 is thus separated from the AC power supply 15 as described above, processing of switching the connection state of the relay 60 from the fixed contact point 61*b* of a reset-side to the fixed contact point 61*a* of a set-side is executed by the control device 80 (S30).

Specifically, a driving signal is output from the control port P5 to the relay driving circuit 70 by the relay control block B3. When the driving signal is output from the control port P5, the transistor Tr1 and the transistor Tr4 become on, so that the forward current flows towards the driving coil 63 in the A direction shown in FIG. 2. Therefore, the connection destination of the moveable contact point 61*c* configuring the relay 60 is switched from the fixed contact point 61*b* of a reset-side to the fixed contact point 61*a* of a set-side. As a result, the switching power supply 20 is connected to the AC power supply 15, and the switching power supply 20 automatically operates.

When the switching power supply 20 starts up by the processing of S30, the processing shifts to S40. On the other hand, when it is determined that the switching power supply 20 is operating (S20: YES), the processing also shifts to S40. When the processing shifts to S40, the mode control block B2 determines whether a shift condition to the power saving mode is satisfied.

In the printer 1, the shift condition to the power saving mode is that the standby state of the printer 1 continues for predetermined time. In S40, when the standby state of the printer 1 continues less than the predetermined time, the mode control block B2 determines that the shift condition to the power saving mode is not satisfied (S40: NO). In this case, the processing again proceeds to S40 and it is determined whether the shift condition to the power saving mode is satisfied. From this, the processing sequence becomes a state where the printer waits that the shift condition to the power saving mode is satisfied.

For this reason, when the standby state of the printer 1 continues, YES is determined in S40 and the processing proceeds to S50 at the time at which the standby time reaches the predetermined time. When the processing proceeds to S50, the mode control block B2 performs processing of shifting the mode of the switching power supply 20 from the usual mode to the power saving mode. Specifically, a switching instruction of the relay 60 is transmitted from the mode control block B2 to the relay control block B3. The relay control block B3 having received the instruction outputs a driving signal from the control port P6 to the relay driving circuit 70. Thereby, the transistor Tr2 and the transistor Tr3 become on, so that the reverse current flows towards the driving coil 63 in the B direction shown in FIG. 2. Therefore, the connection destination of the moveable contact point 61*c* configuring the relay 60 is switched from the fixed contact point 61*a* of a set-side to the fixed contact point 61*b* of a reset-side. As a result, the auxiliary power supply circuit 50 is connected to the AC power supply 15 and the switching power supply 20 is separated, so that the switching power supply 20 is at an output stop state and shifts from the usual mode to the power saving mode. Incidentally, during the power saving mode, the mode control block B2 and the relay control block B3 of the control device 80 are fed with the power from the auxiliary power supply circuit 50 and are thus operated. Like this, upon the shift to the power saving mode, the switching power supply 20 is separated from the AC power supply 15, so that it is possible to interrupt the current I1 flowing toward the switching power supply 20 from the AC power supply 15 during the power saving mode.

Thereafter, the processing proceeds to S60. When the processing proceeds to S60, the mode control block B2 determines whether a return condition to the usual mode is satisfied. In the printer 1, the return condition to the usual mode is that the mode switching switch SW is operated by the user. When the processing proceeds to S60, the mode control block B2 monitors a voltage of the detection port P3 and detects whether the voltage of the detection port P3 changes. When there is no change in the voltage of the detection port P3, it is determined that the switch SW is not operated, e.g., that the return condition to the usual mode is not satisfied (S60: NO). In this case, the processing again proceeds to S60 and determines whether the return condition to the usual mode is satisfied. From this, the processing sequence becomes a state where the printer waits that the return condition to the usual mode is satisfied.

When the user operates the mode switching switch SW, a change in the voltage of the detection port P3 is detected. Then, the mode control block B2 determines that the return condition to the usual mode is satisfied (S60: YES), and the processing proceeds to S70.

When the processing proceeds to S70, the mode control block B2 of the control device 80 returns the mode of the switching power supply 20 from the power saving mode to the usual mode. Specifically, when the processing proceeds to S70, a switching instruction of the relay 60 is transmitted from the mode control block B2 to the relay control block B3. Then, the relay control block B3 having received the instruction outputs a driving signal from the control port P5 to the relay driving circuit 70. Thereby, the transistor Tr1 and the transistor Tr4 become on, so that the forward current flows towards the driving coil 63 in the A direction shown in FIG. 2. Therefore, the connection destination of the moveable contact point 61*c* configuring the relay 60 is switched from the fixed contact point 61*b* of a reset-side to the fixed contact point 61*a* of a set-side. As a result, the switching power supply 20 is connected to the AC power supply 15, and the auxiliary power supply circuit 50 is separated. Like this, upon the shift to the usual mode, the auxiliary power supply circuit 50 is separated from the AC power supply 15, so that it is possible to interrupt the current flowing through the auxiliary power supply circuit 50 from the AC power supply 15 during the usual mode.

After the switching of the relay 60, the switching power supply 20 connected to the AC power supply 15 automatically starts up and operates under an output state, in other words, returns to the usual mode again.

After that, the processing proceeds to S80. In S80, the control device 80 determines whether the power supply is off (for example, whether the alternating current power supply is cut off, whether the power supply cable is disconnected, and the like). When it is determined that the power supply is not off, the processing proceeds to S40 and it is determined whether the shift condition to the power saving mode is satisfied. When the shift condition to the power saving mode is satisfied, the switching power supply 20 shifts to the power saving mode. On the other hand, when it is determined that the power supply is off, the series of processing is over. Also, in order to detect whether the power supply is off, for example, a zero cross detection circuit configured to output a zero cross pulse signal in correspondence to a zero cross point of the output voltage of the AC power supply 15 may be provided, and it may be determined whether a zero cross pulse signal is output or not. Also, it is possible to detect the connection to the power supply outlet by detecting the zero cross pulse signal.

5. Advantages

As described above, in the printer 1, when starting up the switching power supply 20 (when shifting to the usual mode), the relay 60 is switched to close the fixed contact point 61a of a set-side (S60). According thereto, while the switching power supply 20 is operating (during the usual mode), the auxiliary power supply circuit 50 is separated from the AC power supply 15, so that it is possible to interrupt the current I2 flowing from the AC power supply 15 towards the auxiliary power supply circuit 50. Therefore, while the switching power supply 20 is operating, it is possible to suppress the output current Io of the AC power supply 15, thereby saving the power.

Also, when stopping the switching power supply 20 (when shifting to the power saving mode), the relay 60 is switched to close the fixed contact point 61b of a reset-side (S50). According thereto, while the switching power supply 20 is at a stop (during the power saving mode), the switching power supply 20 is separated from the AC power supply 15, so that it is possible to interrupt the current I1 flowing from the AC power supply 15 towards the switching power supply 20. Therefore, while the switching power supply 20 is at a stop, it is possible to suppress the output current Io of the AC power supply 15, thereby saving the power.

Further, in the printer 1, regarding the contact point of the relay 60, the transfer contact point 61 is used. The transfer contact point 61 can selectively switch the connection destination of the AC power supply 15 to any one of the switching power supply 20 and the auxiliary power supply circuit 50 by the one relay. For this reason, for example, compared to a configuration where a dedicated relay is provided for each of the switching power supply 20 and the auxiliary power supply circuit 50, it is possible to reduce the number of relays, which has a cost merit. Further, in this illustrative embodiment, since the relay 60 is provided on only the power supply line of the live LV-side, it is possible to reduce the number of relays, compared to a configuration where the relay is provided for each of the live LV-side and the neutral-side. Further, in the printer 1, since the relay 60 is provided between the AC power supply 15 and the coupling capacitor C4, it is possible to separate the whole auxiliary power supply circuit 50 from the AC power supply 15. Thereby, while the switching power supply 20 is at a stop, it is possible to almost interrupt the current flowing from the AC power supply 15 towards the auxiliary power supply circuit 50.

Second Illustrative Embodiment

Figure 5:
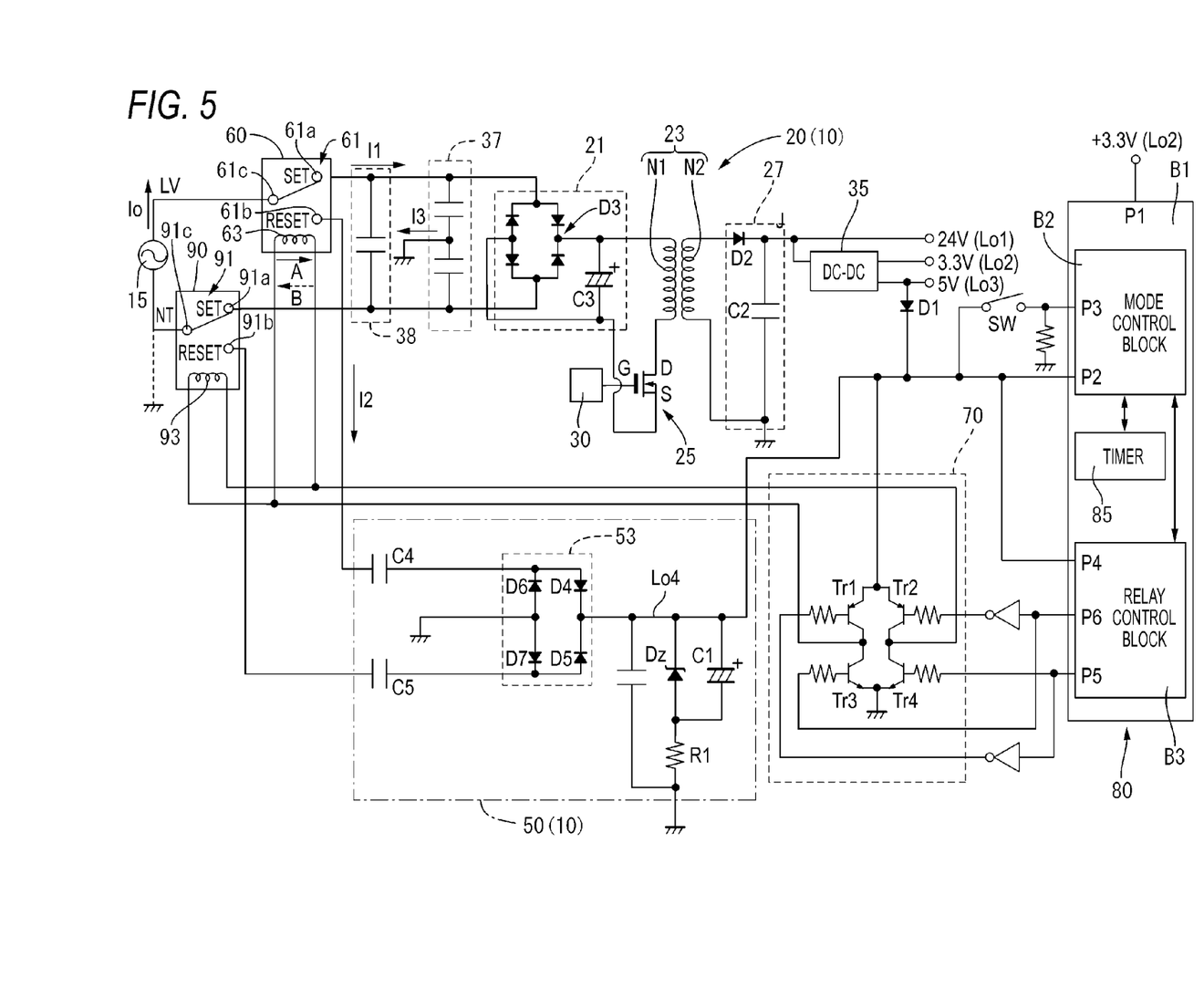
FIG. 5 is a circuit diagram of a power supply system according to a second illustrative embodiment.

A second illustrative embodiment of the invention will be described with reference to FIG. 5.

In the first illustrative embodiment, the relay 60 is provided on the line of the live LV-side of the pair of lines (the two lines of the live LV-side and the neutral NT-side) drawn out from the AC power supply 15.

In the second illustrative embodiment, relays 60, 90 are respectively provided on the two lines of the live LV-side and the neutral NT-side. Like the relay 60, the relay 90 includes a transfer contact point 91 and a driving coil 93 configured to switch the transfer contact point 91. Like the transfer contact point 61, the transfer contact point 91 includes a moveable contact point 91c and two fixed contact points 91a, 91b and has a function of selectively switching a connection destination of the AC power supply 15 to any one of the switching power supply 20 and the auxiliary power supply circuit 50.

The driving coil 93 is connected in parallel with the driving coil 63 of the relay 60. For this reason, upon starting up the switching power supply 20 (upon shifting to the usual mode), when a driving signal is output from the control port P5 of the relay control block B3, the current flows through both the driving coils 63, 93 in the forward direction (the A direction shown in FIG. 2), so that the fixed contact points 61a, 91a of a set-side of the two relays 60, 90 are closed. Thereby, while the switching power supply 20 is operating (during the usual mode), the switching power supply 20 is connected to the AC power supply 15 and the auxiliary power supply circuit 50 is separated from both the live LV-side and the neutral NT-side of the AC power supply 15.

On the other hand, upon the stop of the switching power supply 20 (upon the shift to the power saving mode), when a driving signal is output from the control port P6 of the relay control block B3, the current flows through both the driving coils 63, 93 in the reverse direction (e.g., the B direction shown in FIG. 2), so that the fixed contact points 61b, 91b of a reset-side of the two relays 60, 90 are closed. Thereby, while the switching power supply 20 is at a stop (during the power saving mode), the auxiliary power supply circuit 50 is connected to the AC power supply 15 and the switching power supply 20 is separated from both the live LV-side and the neutral NT-side of the AC power supply 15.

As described above, in the second illustrative embodiment, while the switching power supply 20 is operating, the auxiliary power supply circuit 50 is separated from both the live LV-side and the neutral NT-side of the AC power supply 15. According thereto, compared to a configuration where only one line of the live LV-side and the neutral NT-side is separated, it is possible to further reduce the current flowing through the auxiliary power supply circuit 50 while the switching power supply 20 is operating, thereby saving the power of the power supply device 10.

Incidentally, when both lines of the live LV-side and the neutral NT-side are separated, it may be possible to further reduce the current that is consumed in the auxiliary power supply circuit 50, compared to the configuration where only any one line is separated. The reason may be as follows. When only one line of the two lines is separated, the remaining one line is still connected to the AC power supply 15, so that it may be influenced by the change in the voltage of the AC power supply 15. Thereby, a voltage variation component may be generated on the output line Lo4 of the rectification circuit 53. As a result, the current may flow through the capacitor C1, depending on the voltage variation component, so that the power may be uselessly consumed. In contrast, when both the two lines are separated, a voltage variation component is not generated on the output line Lo4 of the rectification circuit 53. For this reason, it may be possible to completely interrupt the current flowing from the AC power supply 15 towards the auxiliary power supply circuit 50.

Third Illustrative Embodiment

A third illustrative embodiment of the invention will be described with reference to FIGS. 6 and 7.

In the first illustrative embodiment, the relay 60 is provided between the AC power supply 15 and the auxiliary power supply circuit 50. Specifically, the relay 60 is provided at the closer position of the line of the live LV-side drawn out from the AC power supply 15 to the AC power supply 15 than the coupling capacitor C4.

Figure 6:
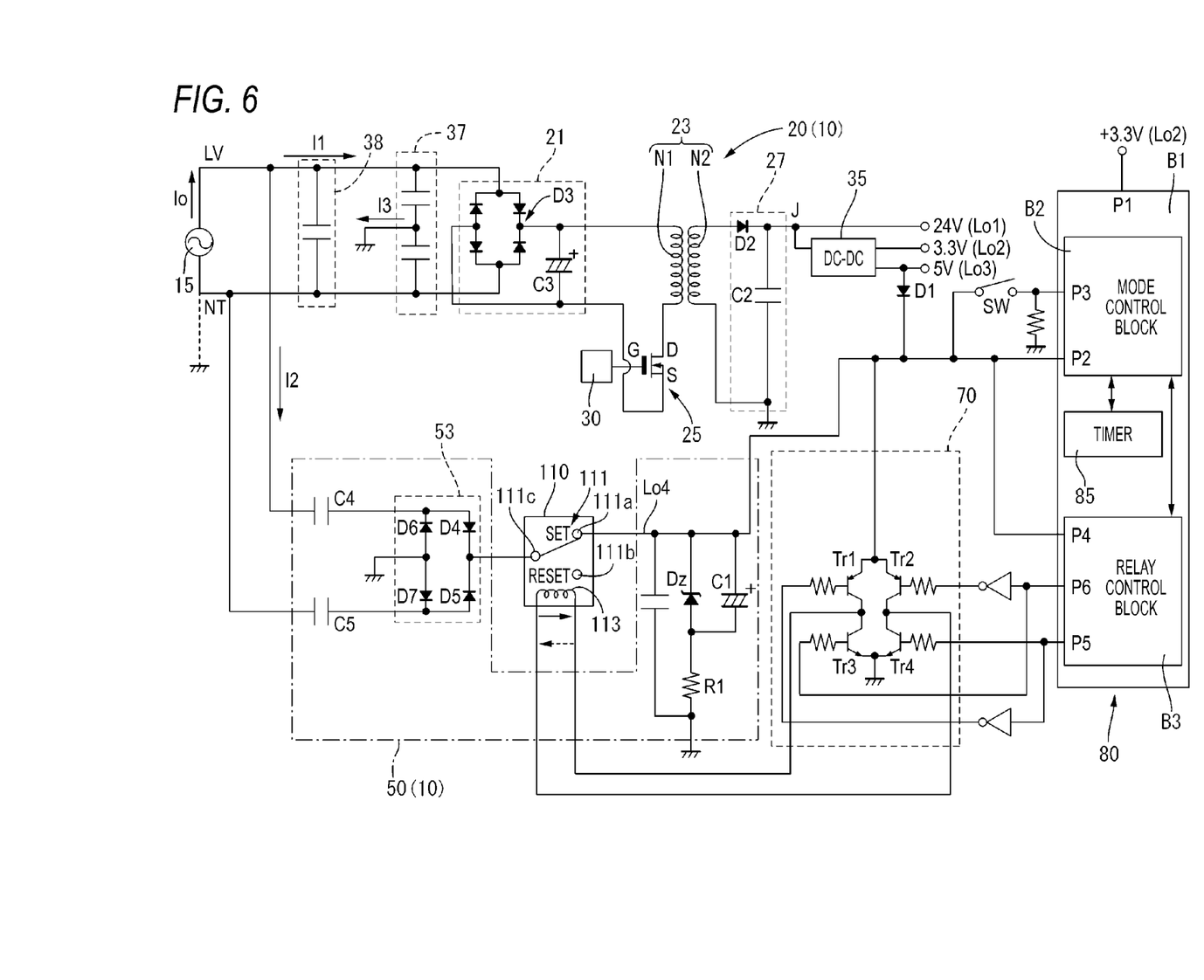
FIG. 6 is a circuit diagram of a power supply system according to a third illustrative embodiment.
Figure 7:
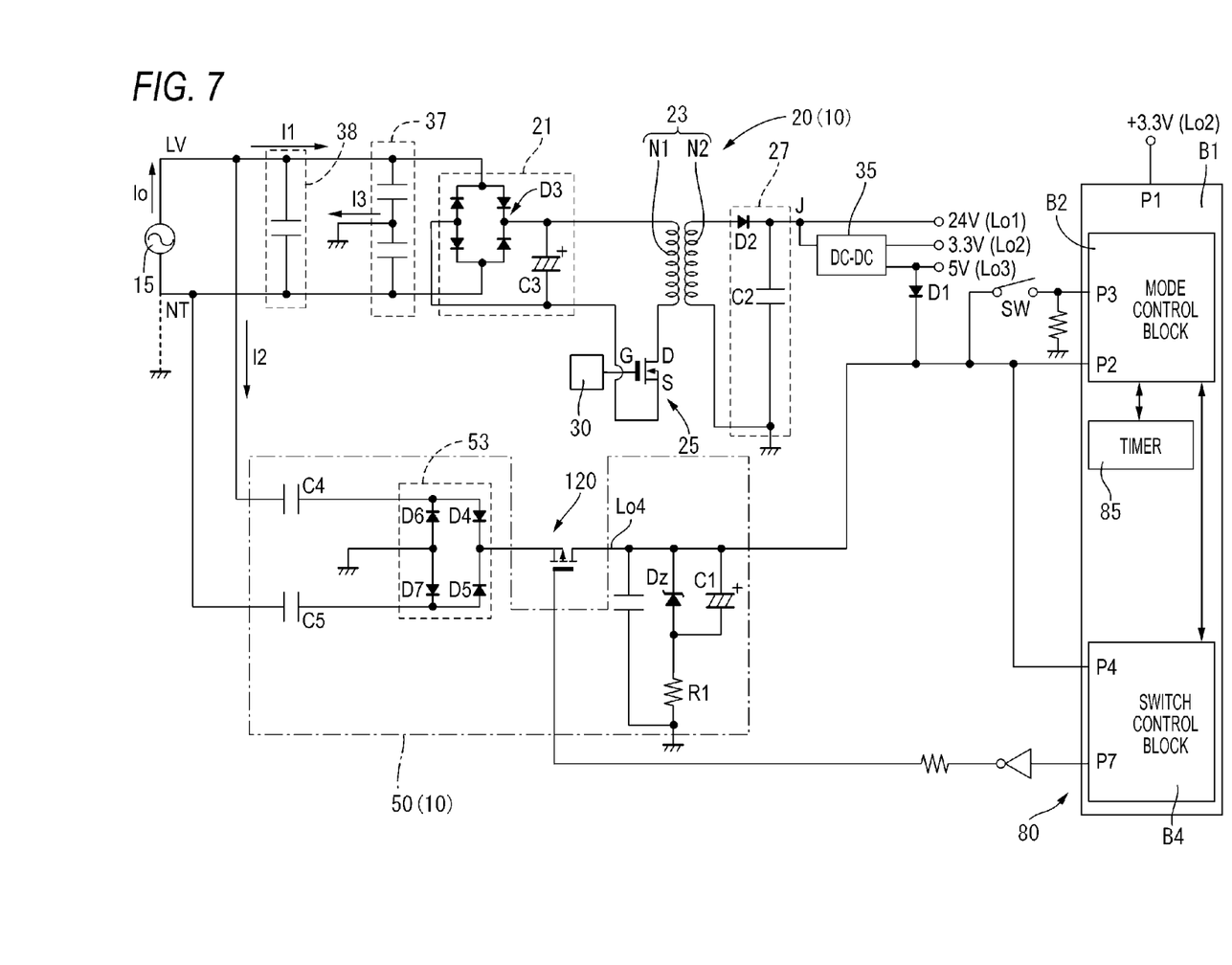
FIG. 7 is a circuit diagram of a power supply system, showing a configuration where a relay is replaced with an FET.

In the third illustrative embodiment, a relay 110 as shown in FIG. 6 is provided on a line connecting the rectification circuit 53 and the capacitor C1, e.g., on the output line Lo4. The relay 110 includes a transfer contact point 111 and a driving coil 113 configured to switch the transfer contact point 111. The transfer contact point 111 includes two fixed contact points 111a, 111b and a moveable contact point 111c and has a function of opening and closing the output line Lo4 of the rectification circuit 53. Specifically, the moveable contact point 111c is connected to the rectification circuit 53, the fixed contact point 111a of a set-side is connected to the capacitor C1 and the fixed contact point 111b of a reset-side is not connected.

For this reason, when the driving coil 113 is energized in the forward direction (an A direction shown in FIG. 6) to thus close the fixed contact point 111a of a set-side, the output line Lo4 is closed, so that the current flows from the AC power supply 15 towards the capacitor C1 or control device 80 via the rectification circuit 53. On the other hand, when the driving coil 113 is energized in the reverse direction (a B direction shown in FIG. 6) to thus close the fixed contact point 111b of a reset-side, the output line Lo4 is opened. Therefore, the capacitor C1 is separated from the AC power supply 15, e.g., the auxiliary power supply circuit 50 is separated from the AC power supply 15.

Therefore, when staring up the switching power supply 20 (when shifting to the usual mode), the relay 110 is switched to close the fixed contact point 111b of a reset-side. Thereby, while the switching power supply 20 is operating (during the usual mode), it is possible to separate the auxiliary power supply circuit 50 from the AC power supply 15 and to interrupt the current I2 flowing from the AC power supply 15 towards the auxiliary power supply circuit 50, e.g., the current flowing through the capacitor C1 or control device 80 via the rectification circuit 53. Therefore, like the first and second illustrative embodiments, while the switching power supply 20 is operating, it is possible to suppress the output current Io of the AC power supply 15, thereby saving the power of the image forming unit 10.

On the other hand, when stopping the switching power supply 20 (upon the shift to the power saving mode), the relay 110 is switched to close the fixed contact point 111a of a set-side. According thereto, the output line Lo4 is closed while the switching power supply 20 is at a stop (during the power saving mode). Therefore, since the auxiliary power supply circuit 50 is connected to the AC power supply 15, the power can be fed from the rectification circuit 53 to the control device 80 or capacitor C1.

When the relay 110 is provided on the output line Lo4 of the rectification circuit 53, the current to be interrupted is less than the configuration where the relay 60 is provided between the AC power supply 15 and the switching power supply 20, like the first and second illustrative embodiments. For this reason, it is possible to use the relay 110 of a small capacity. Therefore, it is possible to make the relay 110 small. Further, since it is possible to use a semiconductor switching device (refer to FIG. 7) such as FET 120 alternative to the relay 110, it is possible to miniaturize the circuit, which has a cost merit. Incidentally, in the example of FIG. 7, a switch control block B4 is provided instead of the relay control block B3, and the control signal (the driving signal) is output from a control port P7 of the switch control block B4, thereby turning on and off the FET 120.

Modifications to Illustrative Embodiments

The invention is not limited to the illustrative embodiments described above and shown in the drawings. Following illustrative embodiments may also be included in the technical scope of the invention.

(1) In the first to third illustrative embodiments, the power supply system S is used for the printer. However, the power supply system can be applied to any electric device and the utility of the power supply system S is not limited to the printer. For example, the power supply system can be widely used for home appliances such as a television, a video recorder and the like. Further, although the electrophotographic printer has been exemplified in the first to third illustrative embodiments, the invention can be also applied to an inkjet printer.

(2) In the first illustrative embodiment, the relay 60 is provided on the power supply line of the live LV-side. Alternatively, the relay 60 may be provided on the power supply line of the neutral NT-side. That is, the relay may be provided on at least one of the power supply lines.

Figure 8:
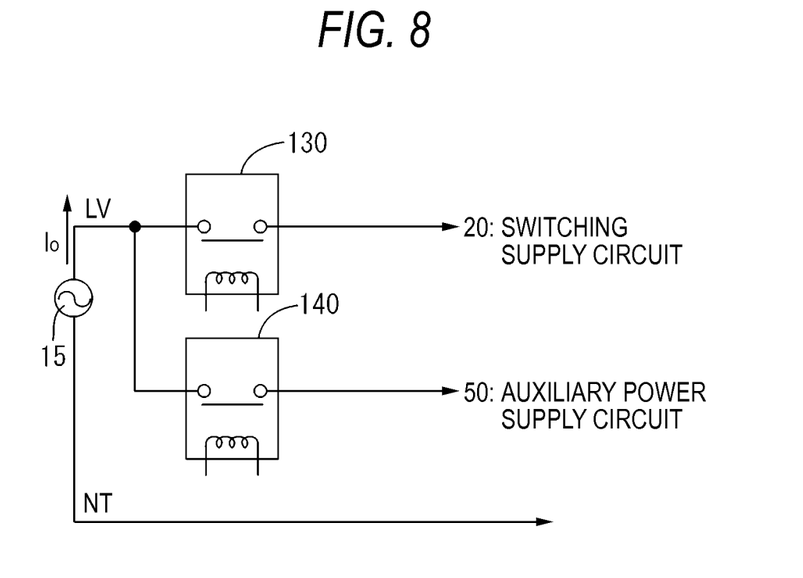
FIG. 8 is a circuit diagram of a power supply system in another illustrative embodiment.

(3) In the first illustrative embodiment, the transfer contact point is used for the contact point 61 of the relay 60. However, the relay 60 is not limited to the transfer contact point. For example, as shown in FIG. 8, relays 130, 140 of a make contact point type may be respectively provided on the switching power supply 20 and the auxiliary power supply circuit 50. When starting up the switching power supply 20 (when shifting to the usual mode), the control device 80 turns on the relay 130 that corresponds to the second switching unit and turns off the relay 140 that corresponds to the first switching unit. According thereto, while the switching power supply 20 is operating, the auxiliary power supply circuit 50 is separated from the AC power supply 15, so that it is possible to interrupt the current I2 flowing from the AC power supply 15 towards the auxiliary power supply circuit 50. Therefore, while the switching power supply 20 is operating, it is possible to suppress the output current Io of the AC power supply 15, thereby saving the power.

On the other hand, when stopping the switching power supply 20 (when shifting to the power saving mode), the control device 80 turns off the relay 130 that corresponds to the second switching unit and turns on the relay 140 that corresponds to the first switching unit. According thereto, while the switching power supply 20 is at a stop, the switching power supply 20 is separated from the AC power supply 15, so that it is possible to interrupt the current I1 flowing from the AC power supply 15 towards the switching power supply 20. Therefore, while the switching power supply 20 is at a stop, it is possible to suppress the output current Io of the AC power supply 15, thereby saving the power.

What is claimed is:

1. A power supply system comprising:
a switching power supply configured to convert an alternating current voltage from an alternating current power supply into a predetermined direct current voltage and to output the direct current voltage;
a control device;
an auxiliary power supply circuit, which is connected in parallel with the switching power supply with respect to the alternating current power supply, and which comprises an electricity storage unit configured to store electricity by charging current fed from the alternating current power supply, wherein the auxiliary power supply circuit is configured to feed power to the control device; and a relay including a transfer contact point configured to selectively connect the alternating current power supply to one of the auxiliary power supply circuit and the switching power supply, wherein the control device is configured to, in a state where the switching power supply is connected to the alternating current power supply, switch the relay into a state where the auxiliary power supply circuit is separated from the alternating current power supply, wherein the control device is configured to, in a case of stopping the switching power supply, switch the relay into a state where the switching power supply is separated from the alternating current power supply and the auxiliary power supply circuit is connected to the alternating current power supply.

2. The power supply system according to claim 1,
wherein the relay is provided on any one of a pair of lines connecting the alternating current power supply and the auxiliary power supply circuit.

3. The power supply system according to claim 1,
wherein the relay is provided on both of a pair of lines connecting the alternating current power supply and the auxiliary power supply circuit.

4. The power supply system according to claim 1,
wherein the auxiliary power supply circuit comprises:
    a coupling capacitor; and
    a rectification circuit, which is connected to the alternating current power supply through the coupling capacitor, and which is configured to rectify the alternating current voltage from the alternating current power supply,
wherein the electricity storage unit is configured to store electricity by current that is output from the rectification circuit and functions as the charging current, and
wherein the relay is provided on a line connecting the alternating current power supply and the coupling capacitor.

5. The power supply system according to claim 1,
wherein the electricity storage unit is connected to the switching power supply even in the state where auxiliary power supply circuit is separated from the alternating current power supply.

* * * * *